United States Patent
Bulka (10) Patent No.: US 9,194,538 B2
(45) Date of Patent: Nov. 24, 2015

(54) UNIVERSAL VERSATILE MULTI-USE CLAMPING HOLDER

(71) Applicant: David Bulka, West Caldwell, NJ (US)

(72) Inventor: David Bulka, West Caldwell, NJ (US)

(*) Notice: Subject to any disclaimer, the term of this patent is extended or adjusted under 35 U.S.C. 154(b) by 0 days.

(21) Appl. No.: 14/283,520

(22) Filed: May 21, 2014

(65) Prior Publication Data

US 2015/0211678 A1 Jul. 30, 2015

Related U.S. Application Data

(60) Provisional application No. 61/965,254, filed on Jan. 27, 2014.

(51) Int. Cl.
*A47B 96/06* (2006.01)
*F16M 13/02* (2006.01)
*F16M 11/06* (2006.01)
*F16M 13/04* (2006.01)

(52) U.S. Cl.
CPC .............. *F16M 13/022* (2013.01); *F16M 11/06* (2013.01); *F16M 13/04* (2013.01)

(58) Field of Classification Search
CPC ...... F16M 13/022; F16M 11/06; F16M 13/04
USPC ............... 248/229.16, 229.17, 230.7, 231.81, 248/316.7, 74.2, 229.26
See application file for complete search history.

(56) References Cited

U.S. PATENT DOCUMENTS

| 1,268,622 | A | * | 6/1918 | Reynolds | 362/396 |
|---|---|---|---|---|---|
| 1,570,451 | A | * | 1/1926 | Simoneau | 211/30 |
| 1,774,775 | A | * | 9/1930 | Weitz, Jr. | 248/229.26 |
| 3,216,687 | A | * | 11/1965 | Vardan | 248/103 |
| 3,747,166 | A | * | 7/1973 | Eross | 248/75 |
| 4,566,660 | A | * | 1/1986 | Anscher et al. | 248/74.2 |
| 4,688,961 | A | * | 8/1987 | Shioda et al. | 403/389 |
| 5,605,312 | A | | 2/1997 | Elder et al. | |
| 5,803,127 | A | * | 9/1998 | Rains | 138/113 |
| 7,570,301 | B2 | | 8/2009 | Gilor | |
| 8,128,046 | B1 | | 3/2012 | Howard, Jr. | |
| 8,544,161 | B2 | | 10/2013 | Carnevali | |
| 8,777,170 | B2 | * | 7/2014 | Gilbert et al. | 248/229.16 |
| 2010/0012804 | A1 | * | 1/2010 | Egan | 248/231.81 |
| 2012/0309256 | A1 | * | 12/2012 | Theodore | 446/72 |

* cited by examiner

*Primary Examiner* — Gwendolyn Baxter (57) ABSTRACT

The invention is a universal holder that can mount diverse objects onto diverse surfaces. The holder comprises two cylindrical clamps made of tensile material, i.e. its jaws may be stretched apart and will spring back with compressive and/or holding force, such that almost any object may be gripped and mounted on almost any surface. Because they are curved yet tensile, the clamps can hug curved objects or surfaces, as well as grip flat objects with compressive force. The clamps are connected such that they are rotatable 360 degrees with respect to each other, and one clamp is slidable around the surface of the other. The rotatable and slidable configuration provides versatility, allowing objects to be mounted for different purposes and in different configurations.

15 Claims, 8 Drawing Sheets

UNIVERSAL VERSATILE MULTI-USE CLAMPING HOLDER

CROSS REFERENCE TO RELATED APPLICATION

This application claims the benefit of priority of U.S. Provisional Application 61/965,254.

BACKGROUND OF THE INVENTION

1. Field of the Invention

The present invention relates generally to universal holders for clamping diverse objects to diverse surfaces.

2. Description of the Related Art

Holders and display mounts are known in the art for a diverse set of objects and devices. Currently and commonly known consumer products include cell phone and tablet holders, headgear camera mounts, and automobile GPS (Global Positioning System) mounts. In order to reliably support and secure the object, such holders are usually suited to a specific type or shape of object being supported or the surface onto which it mounts. For instance, U.S. Pat. No. 8,128,046 to Howard, Jr. discloses a mobile electronic device holder adapted for removable attachment to another device, where the holder is suitable to accepting a rectangular electronic device. U.S. Pat. No. 7,570,301 to Gilor discloses a device for mounting a camera onto a helmet, which requires a support structure of adjustable length rails that grip the edge of the helmet. Thus, device holders are limited to the mechanical means, such as screws, suction, and gripping arms, with which they support or grip particular objects. Even holders that purport to be universal are usually limited in one way or another by the means chosen to support or secure. For instance, U.S. Pat. No. 8,544,161 to Carnevali relies on pressure sensitive adhesive to adhere to a mounting surface, thus restricting the holder's use to flat surfaces. U.S. Pat. No. 5,605,312 to Elder et al. uses a cylindrical base that must be mounted on a horizontal tubular member such as a handlebar of an exercise machine.

BRIEF SUMMARY OF THE INVENTION

The present invention is a universal holder that can mount diverse objects onto diverse surfaces. The holder comprises two cylindrical clamps comprised of tensile material, i.e. its jaws may be stretched apart and will spring back with compressive and/or holding force, such that almost any object may be gripped and mounted on almost any surface. Because they are curved yet tensile, the clamps can hug curved objects or surfaces, as well as grip flat objects with compressive force. The jaws of one clamp may comprise a bumper stop in order to support flat objects placed facing outward.

Figure 9:
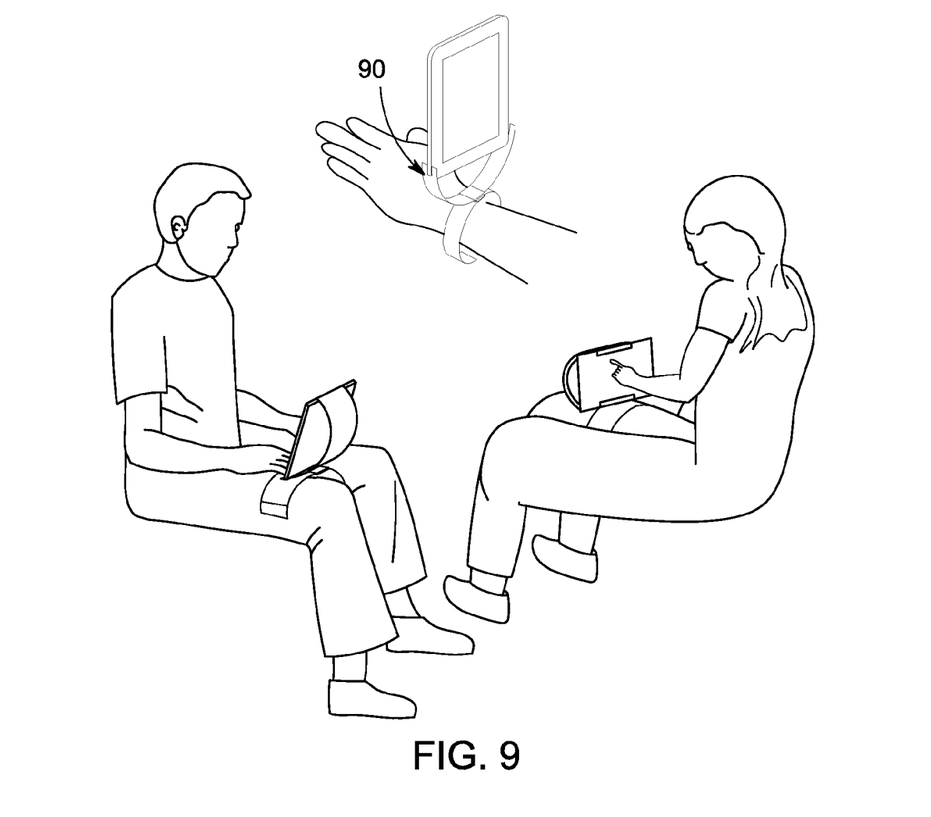
FIG. 9 shows the invention being used as an attachment to the human body.

The clamps are connected such that they are rotatable 360 degrees with respect to each other, and one clamp is slidable around the surface of the other. The rotatable and slidable configuration provides versatility, allowing objects to be mounted for different purposes and in different configurations. For instance, a rectangular device may be placed against the bumper stop to face outward towards a user, and mounted to the side of a desk. The same object may also be placed perpendicular within the clamp and mounted to hang downwards from an automobile rearview mirror. An object may be mounted on a cylindrical surface such as a wrist. The holder is not limited to flat or rectangular objects—objects may be cylindrical, such as a flashlight or a bottle, or soft without a specific profile, such as a stuffed animal or the headrest of an automobile seat. FIG. 9 shows the universal holder being used to hold a variety of objects in a variety of positions, each of which is made possible by the rotating and sliding capabilities of the holder. The cylindrical shape of the clamps furthermore enables them to be nested within each other and easily packaged. A quick release snap allows the clamps to be easily assembled and disassembled.

The universal and multi-use holder has wide ranging applications such as hands-free multitasking while working, driving, and exercising. It also has space saving applications, for the holder can be used to mount a device on the side of a desk, or to mount bottles within a cabinet door. Examples of objects it would hold are cell phones, tablets, books, water bottles, cameras, remote controls, calculators, air purifiers, GPS devices, vitamin bottles, spice bottles, prescriptions, herbal oils, lotions, shampoos, flashlights, cans, and soft items that have no specific profile shape, like a pillow, teddy bear, doll, or toy. Examples of mounting surfaces to which the holder would attach are numerous, and include the human body, animals such as domestic pets, furniture, appliances, school equipment such as desks and lockers, automobile surfaces inside and out, movie theater seats, trees, poles, rocks, fences, railings, picnic tables, motorcycles and bicycles.

BRIEF DESCRIPTION OF THE DRAWINGS

In the following drawings, like reference numbers have been used wherever possible to indicate like parts in the various views.

DETAILED DESCRIPTION OF THE INVENTION

Figure 1:
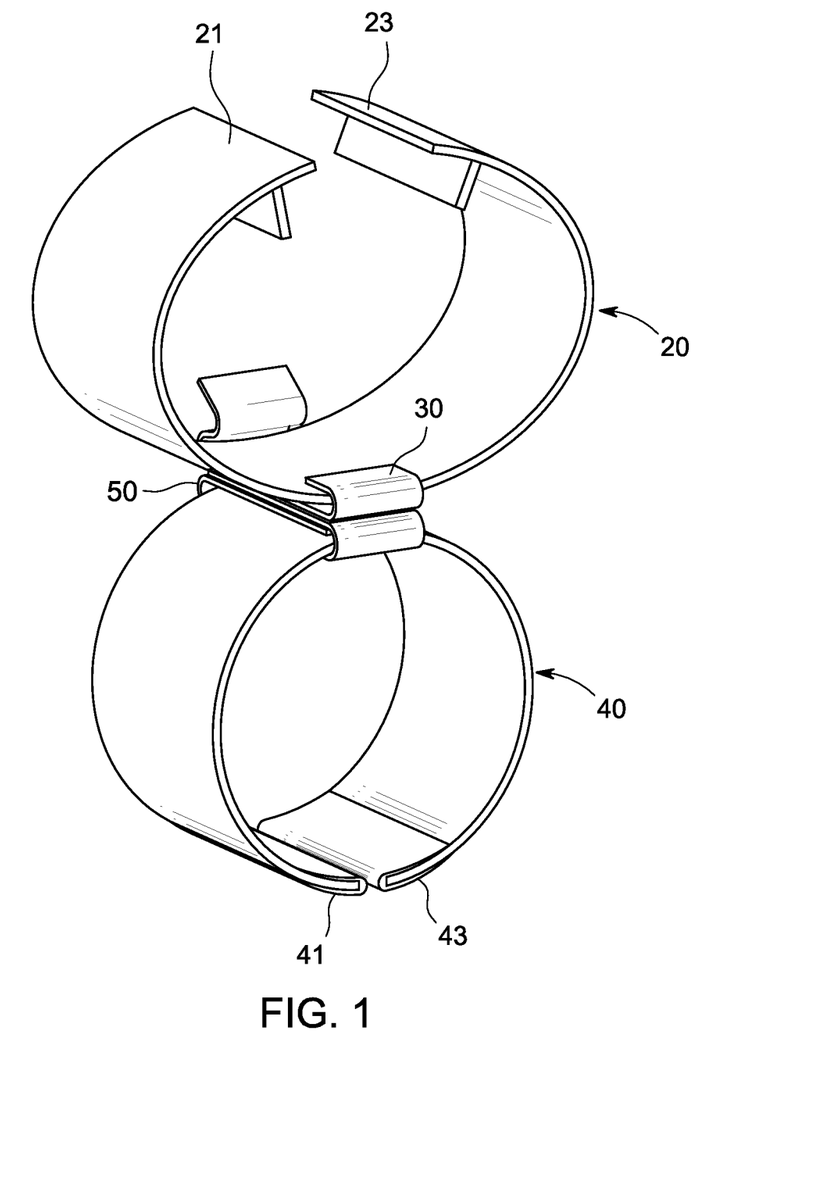
FIG. 1 is a full view of an embodiment of the present invention.
Figure 2A:
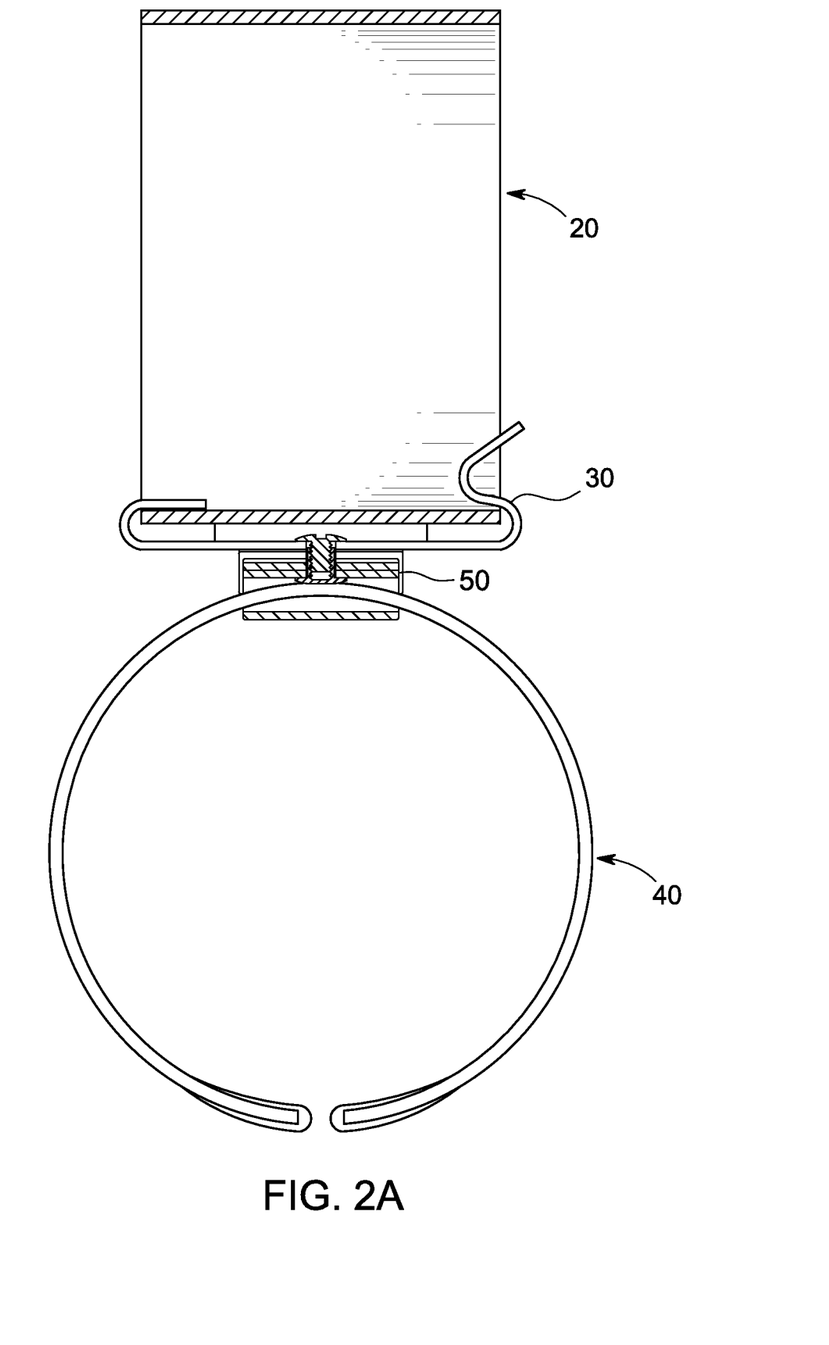
FIGS. 2A and 2B show alternate views of the present invention where clamps are in 90 degree rotation with respect to each other.
Figure 2B:
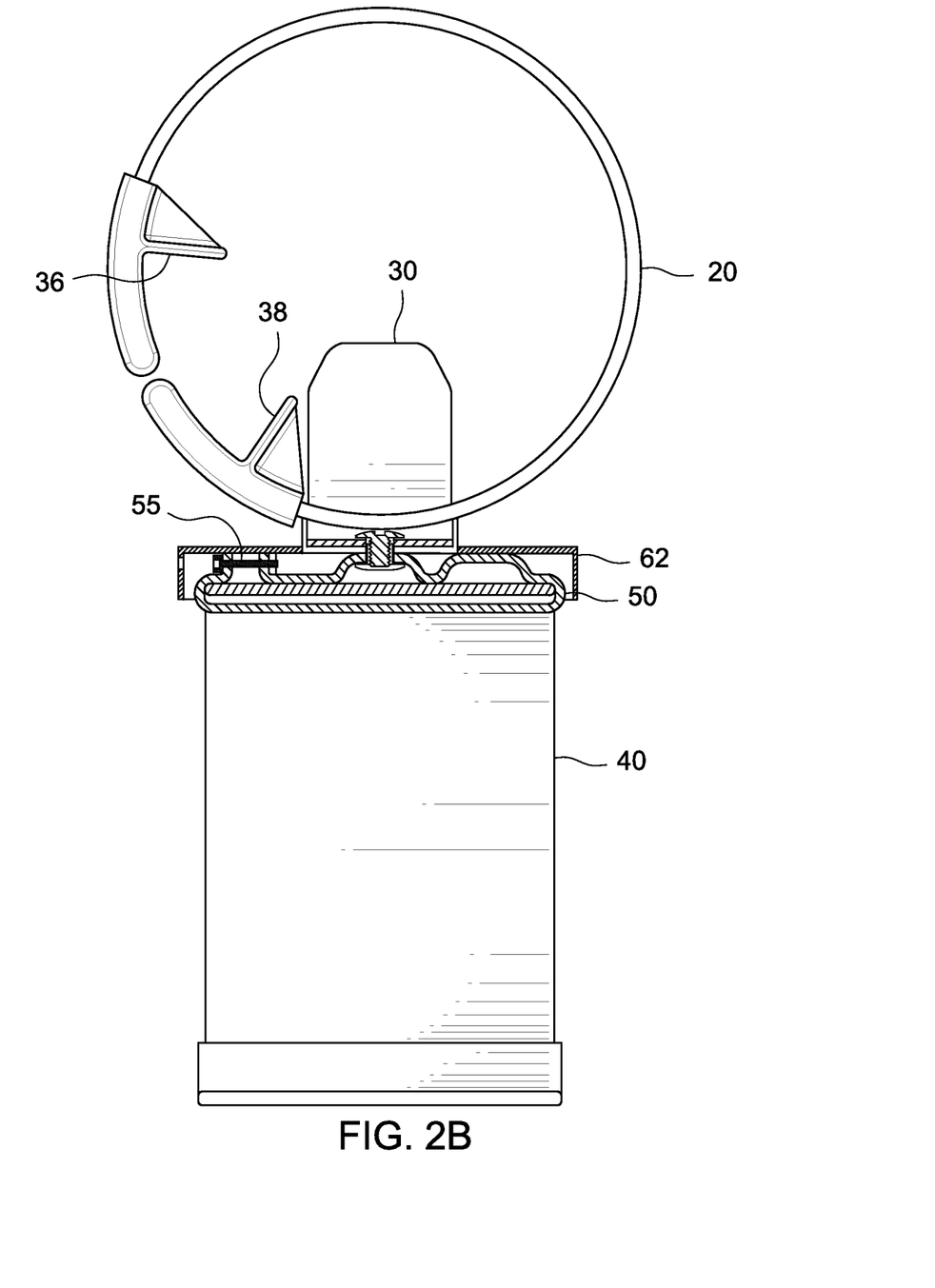

FIG. 1 is a depiction of the preferred embodiment. Two C-shaped clamps 20 and 40 comprised of tensile material, i.e. such that the jaws of each clamp may be stretched apart and will spring back with compressive and/or holding force, are connected so as to be slidable around each other and rotatable 360 degrees with respect to each other. FIGS. 2A and 2B show alternate views of clamps 20 and 40 in a 90 degree rotation with respect to each other. Sleeves 30 and 50 hold the clamps, which may slide through the sleeves to a desired position. A connector, such as a screw as pictured as connector 75 in close-up view in FIG. 3, rotatably attaches the sleeves. Other connectors contemplated include wingnuts, posts, dowels, Velcro, magnets, or any tool that allows for rotation and attachment.

Figure 3:
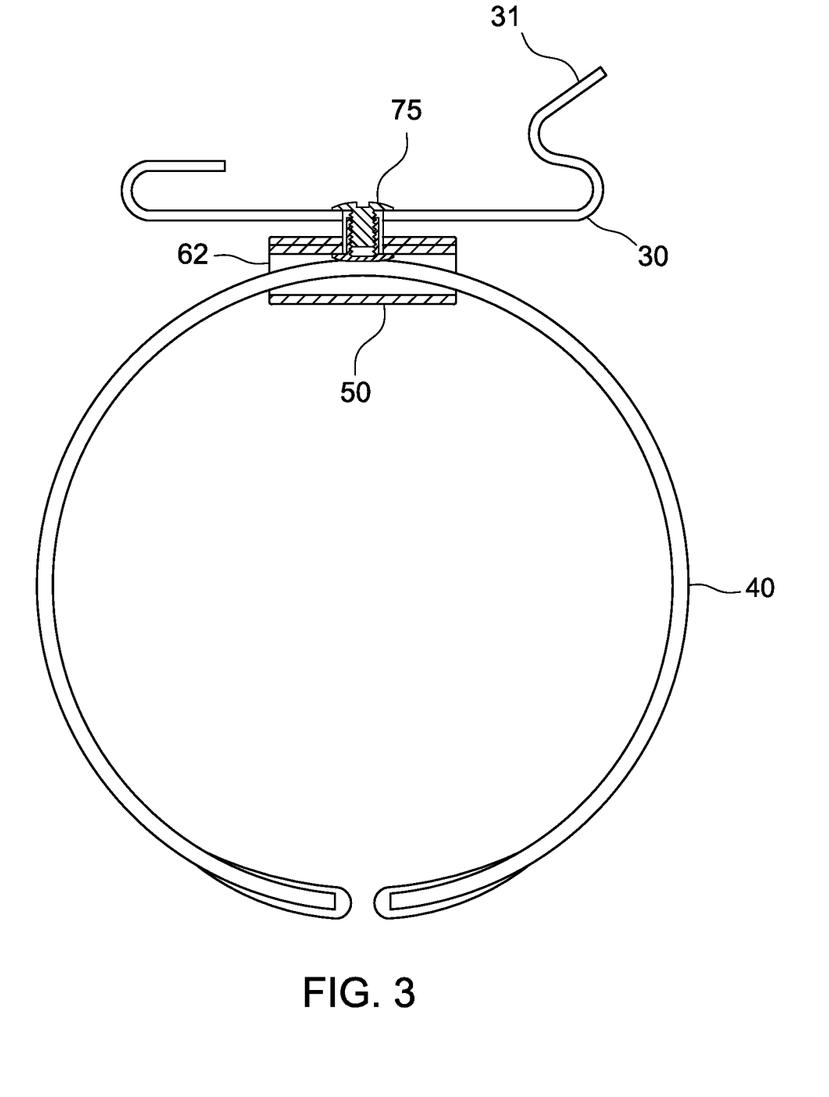
FIG. 3 is a close-up view of a bottom clamp of the invention and a first and second sleeve embodiment that connect the bottom clamp to a second clamp.
Figure 5:
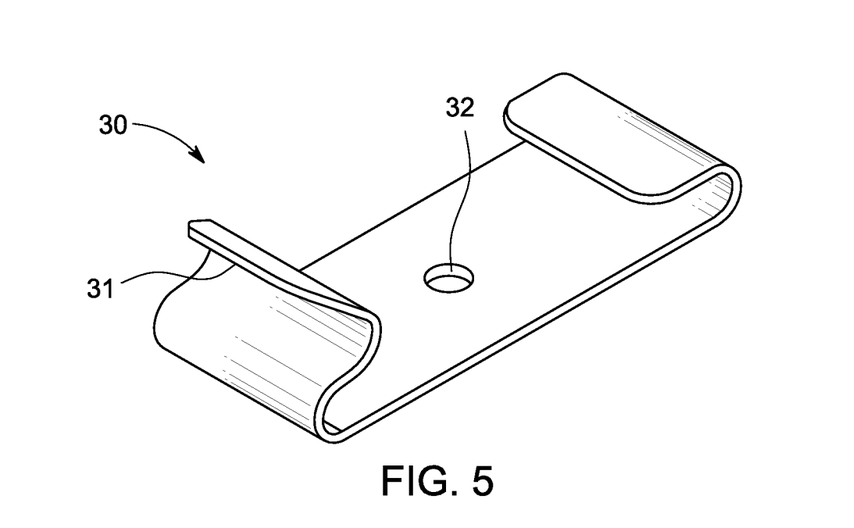
FIG. 5 shows an example of a quick-release sleeve.

As shown in close-up view FIG. 3, clamp 20 (not shown) would be able to slide through quick-release sleeve 30, and press and release of snap 31 detaches and attaches clamp 20 to and from the quick-release sleeve. Close up of the quick release sleeve 30 is shown in FIG. 5. If a screw or other rigid connector is used to connect sleeves 30 and 50, the connector may be placed through an opening 32.

Figure 4:
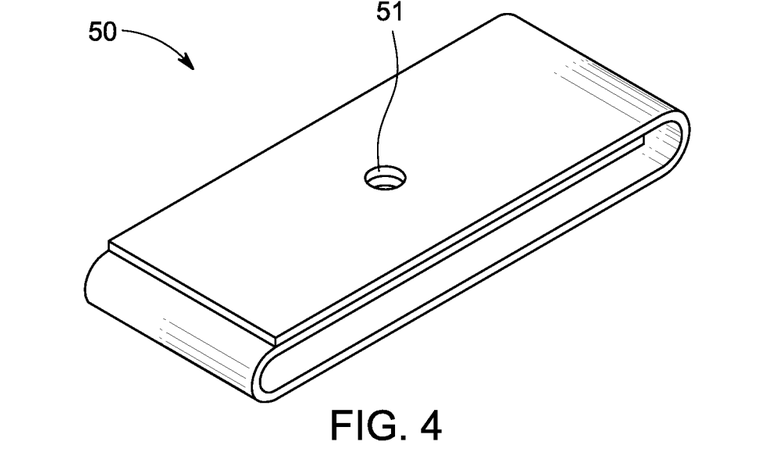
FIG. 4 shows an example of a wraparound sleeve.

A wraparound sleeve 50, a basic depiction of which is shown in FIG. 4, holds clamp 40 and allows it to slide. If a screw or other rigid connector is used to connect sleeves 30 and 50, the connector may be placed through an opening 51. In the preferred embodiment, seen in FIG. 2B, wraparound sleeve 50 comprises a screw 55 that may be tightened to maintain tension as the sleeve loosens or wears. As shown in FIG. 2B, cover 62 may be used to hide the wraparound sleeve for aesthetic purposes.

The quick-release and wraparound sleeves may comprise any material including plastic, polyethelene, steel, and/or alloys. Metal materials will facilitate use of magnet connectors. Soft material such as felt may line the inside of either or both sleeves, creating friction and preventing the clamp from sliding. It will be evident to one skilled in the art that the wraparound and quick-release sleeves may correspond to either the top or the bottom clamps, depending on what is desired by the user or manufacturer.

Each clamp is comprised of a tensile material, meaning that its jaws may be stretched apart and will spring back with holding, or compressive, force. Examples of such material are PVC, polyethylene, carbon steel and heat-treated stainless steel. A tensile material has a low propensity to shatter, such as metal that has been heat-treated. The clamps may be comprised of magnetic metals.

Figure 6:
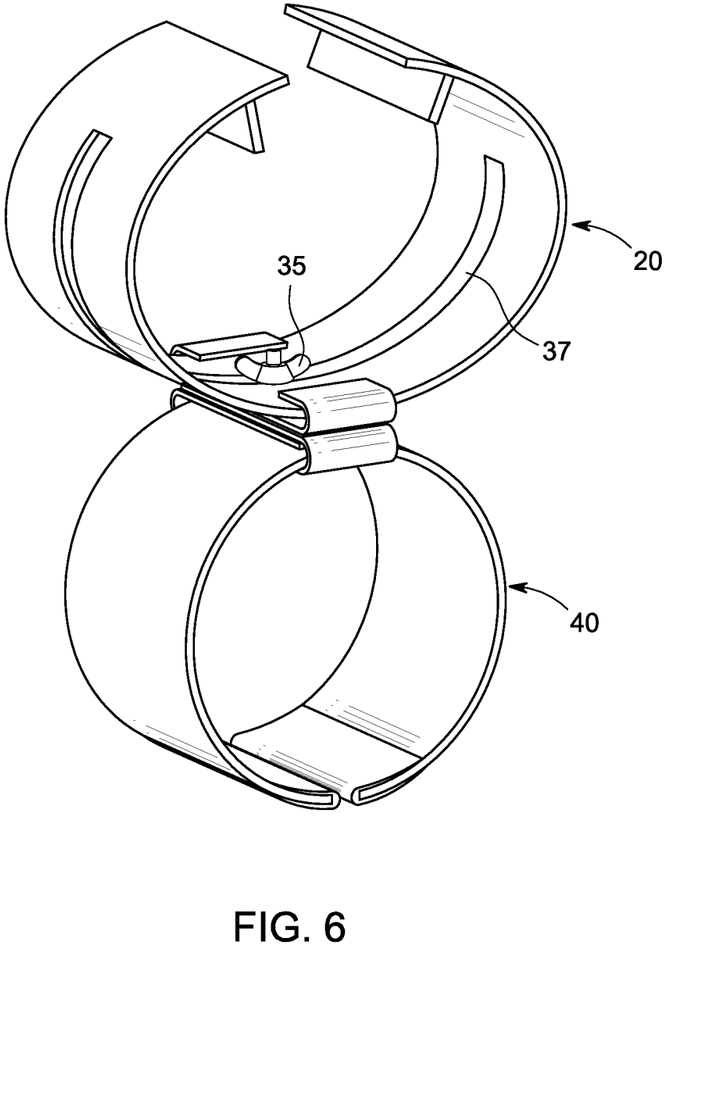
FIG. 6 is a full view of an alternative embodiment of the invention with a sliding slit feature.

Sliding may also be accomplished by lengthwise openings in the clamps, rather than via the sleeves described above. In an alternative embodiment, shown in FIG. 6, clamp 20 comprises a lengthwise opening 37 through which connector 35 has been securely placed. In the embodiment depicted in FIG. 6, connector 35 comprises a wingnut. Connector 35 slides through lengthwise opening 37, so that clamp 40 is slidable around the surface of clamp 20.

Figure 7A:
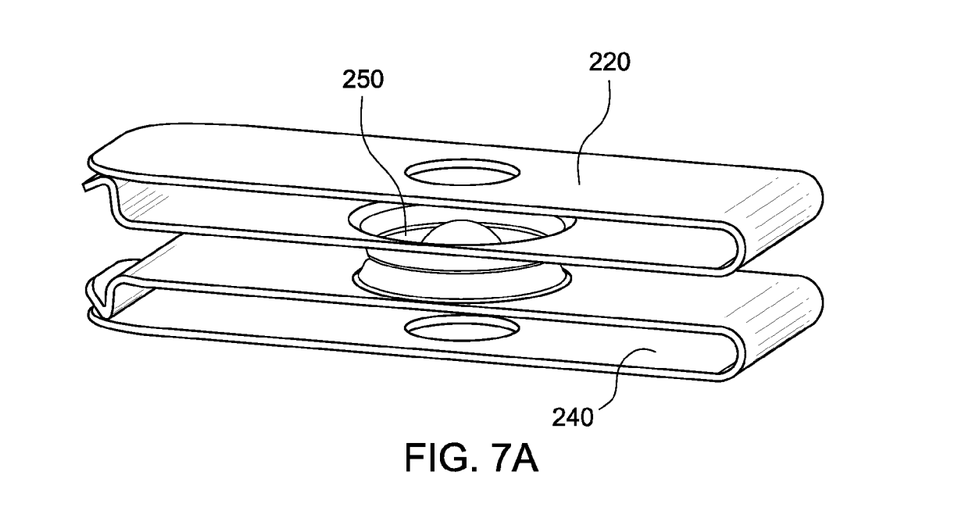
FIG. 7A shows an example of a dual-clip.
Figure 7B:
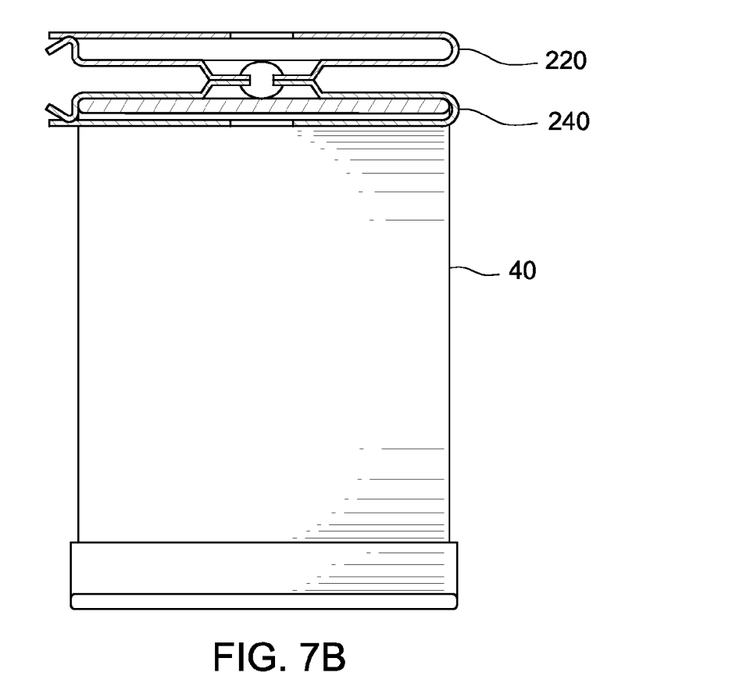
FIG. 7B shows a dual-clip attached to a clamp.

In another embodiment, shown in FIG. 7A, a two-sided or dual clip rotatably and slidably connects the two clamps. Clips 220 and 240 are pinned together by a connector 250 which also serves as an axis around which the clips may rotate with respect to each other. Each clip holds a clamp, which may slide through the clip and/or be positioned as desired. For instance, FIG. 7B depicts clamp 40 attached to clip 240. The dual-clip also facilitates one-step attachment of the first and second clamp, so that the holder may be easily dismantled, stored, and re-assembled. The dual-clip may even act as a replacement for the first or second clamp, in which a clip (and not a clamp) is used to mount the clamp to a desired surface, for instance a thin surface such as an automobile sun visor. The dual clip may be comprised of any material, and a metal material will facilitate use of magnets that may be used to mount the holder on other metal or magnetic surfaces.

Figure 8:
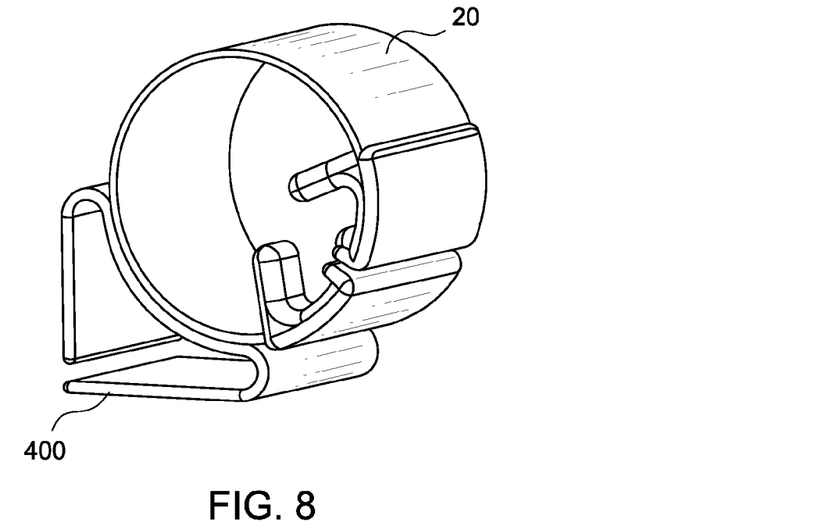
FIG. 8 is a full view of an alternative embodiment of the invention featuring a triangular clamp.

In another embodiment, depicted in FIG. 8, clamp 20 is adjustably mounted on clamp 400, which is triangular to clamp stably to smaller surfaces including rails and automobile visors. Clamp 20 may be adjustably mounted using a re-usable adhesive such as Velcro.

The clamps may be of different sizes, or may be the same size. Because they are curved yet tensile, the clamps can hug curved objects or surfaces, and grip flat objects or surfaces with compressive force. As can also be seen in FIG. 2B, the jaws of one clamp may comprise bumper stops 36 and 38 near the opening of the jaws, so that the clamp may hold objects of many shapes and sizes. For instance, the clamp may hold a flat object, such as a book or tablet, facing outwards towards the user, as illustrated in FIG. 9. The bumper stops may be comprised of a rigid material, or may be comprised of a bendable material that may be compressed but regains shape when not being compressed. The jaws may comprise a notch 90 on each side of the jaw, so the clamp may hold a rectangular object perpendicular in its grasp, as illustrated in FIG. 9.

As noted above, the clamps may be made of PVC, heat-treated stainless steel, polypropylene, or any other tensile material that can grip an object or surface. Metal material allows magnets to attach the clamps to each other, or to other metal or magnetic surfaces. For aesthetic purposes, they may also be coated with shiny, matte, and/or colored materials such as chrome or zinc. The clamps may be made of a material that provides traction, such as vinyl, or the jaws of the clamps may be lined with a traction material. The clamps may also be lined with foam, leather, or other material to promote comfort when mounting on the human body.

What is claimed is:

1. A universal holder comprising:
    a first C-shaped clamp comprised of tensile material;
    a second C-shaped clamp comprised of tensile material, wherein the second clamp is coupled to the first clamp; and
    the first and second clamps are coupled by a sliding sleeve apparatus, the sliding sleeve apparatus comprising (i) a first sleeve that holds the first clamp such that the first clamp may slide through the first sleeve; (ii) a second sleeve that holds the second clamp such that the second clamp may slide through the second sleeve; and (iii) wherein the first and second sleeves are coupled such that they are rotatable around a central axis in opposing directions with respect to each other.

2. The holder of claim 1 wherein at least one of the first or the second clamp comprise two bumpers that are situated on the inside of the clamp at opposite sides of the opening formed at the mouth of the clamp.

3. The holder of claim 2 wherein one or both of the two bumpers are foldable or compressible.

4. The sliding sleeve apparatus of claim 1 wherein at least one of the first sleeve or the second sleeve is operable to attach and to detach from the clamp.

5. The sliding sleeve apparatus of claim 1 wherein at least one of the first sleeve or the second sleeve comprise a tightening screw.

6. The holder of claim 1 wherein at least one of the first clamp or the second clamp is comprised of PVC.

7. The holder of claim 1 wherein at least one of the first clamp or the second clamp is comprised of polyethelene.

8. The holder of claim 1 wherein at least one of the first clamp or the second clamp is comprised of heat-treated carbon steel.

9. A universal holder comprising:
    a first C-shaped clamp comprised of tensile material;
    a second C-shaped clamp comprised of tensile material, wherein the second clamp is coupled to the first clamp; and
    the first and second clamps are coupled by a dual-clip apparatus, the dual-clip apparatus comprising (i) a first clip capable of clipping across the width of the first clamp to hold the clamp, such that the first clamp may slide through the first clip; (ii) a second clip capable of clipping across the width of the second clamp to hold the clamp, such that the second clamp may slide through the second clip; and (iii) wherein the first and second clips are coupled such that they are rotatable around a central axis in opposing directions with respect to each other.

10. The holder of claim 9 wherein at least one of the first or the second clamp comprise two bumpers that are situated on the inside of the clamp at opposite sides of the opening formed at the mouth of the clamp.

11. The holder of claim 10 wherein one or both of the two bumpers are foldable or compressible.

12. The dual clip apparatus of claim 9 wherein at least one of the first clip or the second clip is operable to attach and to detach from the clamp.

13. The holder of claim 9 wherein at least one of the first clamp or the second clamp is comprised of PVC.

14. The holder of claim 9 wherein at least one of the first clamp or the second clamp is comprised of polyethelene.

15. The holder of claim 9 wherein at least one of the first clamp or the second clamp is comprised of heat-treated carbon steel.

* * * * *